US006655033B2

(12) United States Patent
Herrmann et al.

(10) Patent No.: US 6,655,033 B2
(45) Date of Patent: Dec. 2, 2003

(54) PNEUMATIC HAND TOOL WITH IMPROVED CONTROL VALVE

(75) Inventors: Raymond J. Herrmann, Westlake, OH (US); Geoffrey D. Rapp, Westlake, OH (US); Shawn A. Mills, Elyria, OH (US)

(73) Assignee: Bettcher Indusrties, Inc., Birmingham, OH (US)

( * ) Notice: Subject to any disclaimer, the term of this patent is extended or adjusted under 35 U.S.C. 154(b) by 0 days.

(21) Appl. No.: 09/981,692

(22) Filed: Oct. 16, 2001

(65) Prior Publication Data

US 2003/0070301 A1 Apr. 17, 2003

(51) Int. Cl.[7] .......................... B26B 7/00; B23B 45/04

(52) U.S. Cl. .................................... 30/276; 173/168

(58) Field of Search .......................... 30/276; 451/356, 451/357, 358, 359, 449; 173/168, 169, 93.5

(56) References Cited

U.S. PATENT DOCUMENTS 653,557 A * 7/1900 Jenkins .................... 30/276
2,072,445 A * 3/1937 Erling .................... 30/210
3,262,201 A * 7/1966 Docken .................... 30/228
3,472,323 A * 10/1969 Hall .................... 30/276
3,567,330 A * 3/1971 Apelskog et al. .......... 415/29
3,602,990 A * 9/1971 Stumpf .................... 30/276
3,709,630 A * 1/1973 Pohl et al. .............. 173/218
3,722,033 A * 3/1973 Swan .................... 30/276
3,752,241 A * 8/1973 Bent .................... 173/221
3,852,882 A * 12/1974 Bettcher .................. 30/276
3,900,952 A * 8/1975 Landgraf et al. .......... 384/99
4,178,683 A * 12/1979 Bettcher .................. 30/276
4,198,750 A * 4/1980 Bettcher .................. 30/276
4,236,531 A * 12/1980 McCullough ................ 30/276
4,243,111 A * 1/1981 Willoughby et al. ........ 173/169
4,278,427 A * 7/1981 Lingenhole et al. ........ 173/177
4,516,323 A * 5/1985 Bettcher et al. .......... 30/276
4,575,937 A * 3/1986 McCullough ................ 30/276
4,619,047 A * 10/1986 Heckman .................. 30/276
4,696,108 A * 9/1987 Zerrer et al. ............ 30/276
4,721,166 A * 1/1988 Clapp et al. ............. 173/169
4,776,561 A * 10/1988 Braunlich et al. ......... 173/169
4,794,273 A * 12/1988 McCullough et al. ........ 30/276
4,858,321 A * 8/1989 McCullough ................ 30/276
4,942,665 A * 7/1990 McCullough ................ 30/276
4,989,323 A * 2/1991 Casper et al. ............ 30/276
5,025,559 A * 6/1991 McCullough ................ 30/276
5,031,323 A * 7/1991 Honsa et al. ............. 30/276
5,189,844 A * 3/1993 Swarden et al. ........... 173/168
5,230,154 A * 7/1993 Decker et al. ............ 30/276
5,529,532 A * 6/1996 Desrosiers ................ 30/276
5,664,332 A * 9/1997 Whited et al. ............ 30/276
5,761,817 A * 6/1998 Whited et al. ............ 30/276
5,782,836 A * 7/1998 Umber et al. ............. 173/218
5,940,972 A * 8/1999 Baris et al. ............. 30/276
6,033,408 A * 3/2000 Gage et al. .............. 173/218
6,062,323 A * 5/2000 Pusateri et al. .......... 173/169

* cited by examiner

*Primary Examiner*—Allan N. Shoap
*Assistant Examiner*—Jason Prone
(74) *Attorney, Agent, or Firm*—Watts Hoffmann, Co., LPA

(57) ABSTRACT

A pneumatic hand tool comprises a tool body communicable with an operating air source, a pneumatic motor supported by the tool body, and a control valve for controlling air flow to the motor. When the control valve is in an open condition the motor is operated to drive the tool. When the valve is in a closed condition it cuts off the supply of operating air to the motor. In the closed condition the control valve communicates with air at ambient atmospheric pressure so that source air leaking from the control valve is vented away from the motor to preclude unintended motor operation.

14 Claims, 6 Drawing Sheets

PNEUMATIC HAND TOOL WITH IMPROVED CONTROL VALVE

FIELD OF THE INVENTION

The present invention relates to pneumatic hand tools and more particularly to pneumatic hand tools having user operated control valves for governing the flow of operating air to the tool.

BACKGROUND OF THE INVENTION

Pneumatic hand tools having an air powered motor with a user-operated control valve for governing the flow of operating air to the motor are known. Among the various tools that fall within this category are, for example, drills, grinders, meat trimming knives, and skiving, or skinning knives. The knives are used in the meat industry and feature rotating, or oscillating blades that are driven by air motors. Conventionally these tools are connected to a source of high pressure air via a flexible conduit. Their operation is controlled by a user-actuated valve that is opened and closed to start and stop the drive motor.

For safety purposes these tools are often designed so that the user must open the control valve and manually maintain it opened so long as the tool is operated. The valve automatically closes if the user no longer maintains it in its open condition. This minimizes the possibility of tool operation when undesired, which might otherwise result in injury to the user or others. Some tools have handles that house the drive motor and/or the control valve. The user grips the handle and in so doing depresses a valve operating plunger to open the control valve. When the plunger is released the valve closes.

Even though the prior art tools were equipped with control valves of the type referred to, undesired tool operation could sometimes occur. For example, where a tool and/or its source of operating air were improperly maintained, the control valve could be fouled or damaged so that it failed to completely close when the tool was not operating. Consequently, air from the source bled past the valve to the air motor inlet. If the leak has sufficient volume, the air motor will run continuously as long as the air volume remains sufficient. The unintended tool operation was a potential source of workplace injury.

The present invention provides a new and improved pneumatic hand tool that is so constructed and arranged that unintended tool operation is avoided even though the tool motor control valve fails to fully close when the tool is not operating and air from a pressure source bleeds past the valve.

SUMMARY OF THE INVENTION

A pneumatic hand tool constructed according to the invention is connected to a source of pressurized operating air and comprises a tool body communicable with the source, a pneumatic motor supported by the tool body, and a control valve for controlling the flow of air from the source to the motor.

The motor has an inlet that is communicable with the source via the control valve so that when the control valve is in an open condition the motor is operated from the pressure source and drives the tool. When the control valve is in its closed condition the motor is not operated.

The control valve comprises a valve body defining a delivery port through which air is supplied to the motor, a seat surrounding the port, and a valving member movable relative to the seat to open and close the port. The valving member is biased toward engagement with the seat to block flow through the port. In its open condition the control valve is stationed relative to the tool body in a first position where the valve body port communicates directly with the motor inlet and the valving member is spaced from the seat so that air from the source is communicated to the motor. In the closed condition the valving member is in a second position where the valving member engages the seat for blocking flow from the pressure source through the control valve and the valve body delivery port communicates with air at ambient atmospheric pressure so that any source air leaking from the control valve delivery port is vented away from the motor inlet passage.

The disclosed control valve body comprises a tubular projecting end that surrounds the delivery port and the tool body comprises a seal member which seals the projecting end when the valve body is in the first position so that the port and the inlet passage are directly communicated. The valve member projecting end is spaced away from the seal member when the valve body is in the second position.

In the disclosed embodiment a spring biases the valving member toward engagement with the seat.

A valving member actuator is fixed with respect to the tool body for unseating the valving member when the control valve is in its open condition.

In an illustrated embodiment a hand grippable lever is provided for enabling a tool user to easily maintain the control valve in its first position. The lever is movable relative to the tool body between a gripped position where the lever maintains the control valve in the first position to a released position where the control valve shifts to its second position.

The illustrated hand tool is connected to the source by a conduit and the control valve is connected to the conduit and extends into a receptacle formed by the tool body.

Additional features and advantages of the invention will become apparent from the following detailed description of an embodiment of the invention and the accompanying drawings that form part of the specification.

DESCRIPTION OF THE BEST MODE CONTEMPLATED FOR PRACTICING THE INVENTION

Figure 1:
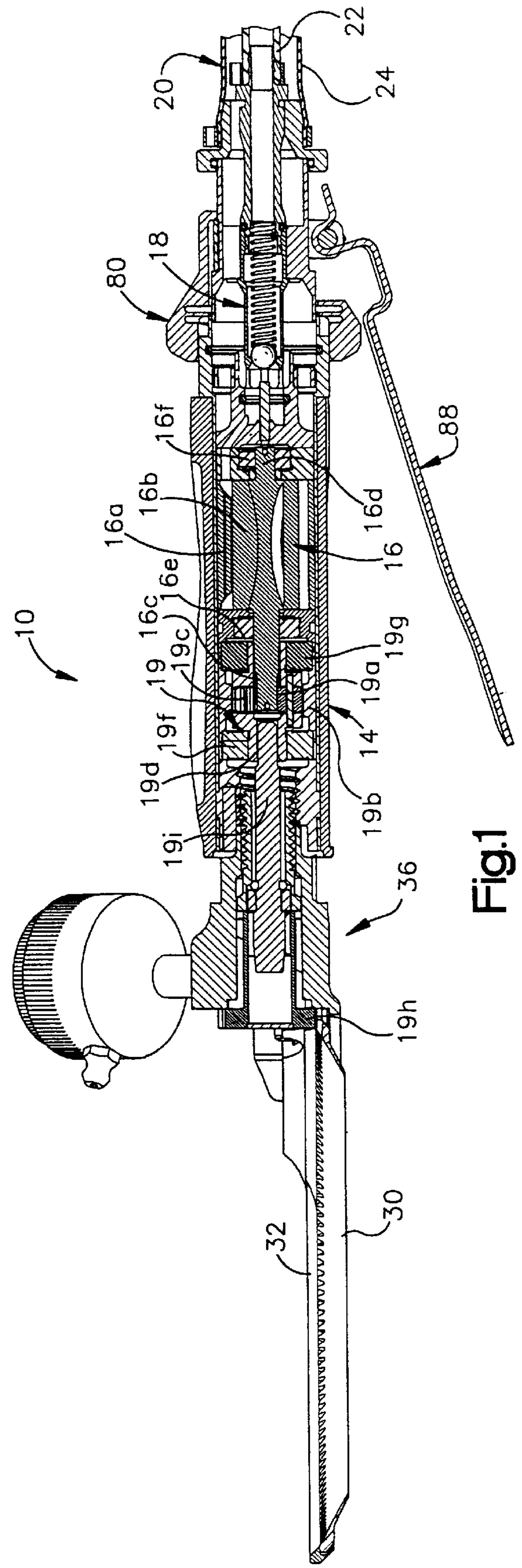
FIG. 1 is an elevational view of a hand tool, constructed according to the invention, connected to a source of high pressure operating air.

A pneumatically operated hand tool 10 constructed according to the invention is illustrated in FIG. 1 of the drawings connected to a high pressure source of operating pressure, not illustrated. The hand tool 10 is illustrated as comprising a tool body 14, a pneumatic motor assembly 16 supported by the tool body 14, and a control valve 18 for controlling the flow of air from the source to the motor assembly 16 and a drive transmission assembly 19 for transmitting drive from the motor to a tool element.

The hand tool 10 is illustrated and described as connected to the source via a flexible conduit 20 that permits the tool user to move about and manipulate the tool freely. The conduit 20 may be of any conventional or suitable construction and is illustrated as an assembly of flexible rubber-like hoses 22, 24 that are respectively connected, at one end, to the source and a vent path to atmosphere by a suitable coupling, not illustrated, and detachably connected, at the opposite end, to the tool body 14. In the illustrated embodiment, the hoses 22, 24 are coextensive, with the hose 22 illustrated as disposed loosely within the hose 24. The hose 22 communicates the source pressure to the motor assembly 16. The hose 24 vents air from within the tool body 14 (e.g. air exhausted from the motor assembly 16) to an exhaust manifold and sound attenuating muffler (not illustrated) and to atmosphere remote from the tool body adjacent the connection to the pressure source.

The motor assembly 16 comprises a stator 16*a* fixed in the tool body and a rotor 16*b* disposed within the stator. The rotor 16*b* has a drive shaft 16*c* projecting from one end and a support shaft 16*d* projecting from the opposite end. Bearing assemblies 16*e*, 16*f* support the shafts 16*c*, 16*d*, respectively. The rotor and stator may be of any suitable or conventional construction and therefore are not described in further detail.

For purposes of illustration and description the hand tool 10 is disclosed as an industrial meat trimming knife. The tool element is illustrated as an annular blade 30 that is supported for rotation about its central axis by a blade housing 32. The blade and blade housing are supported by a head assembly 36 attached to the tool body 14 by means of a connector which in the disclosed embodiment is a screw. The tool body 14 is illustrated as a tubular handle assembly that the tool user grips while using the knife. The blade 30 is driven about its axis by the motor assembly 16 via the drive transmission 19.

The drive transmission 19 provides a gear reduction between the motor assembly and the knife blade. The transmission is illustrated as an epicyclic gear train disposed within the tool body 14. As shown, the output shaft 16*c* has gear teeth formed on its periphery and forms a sun gear 19*a* that rotates within a ring gear 19*b* fixed in the tool body 14. Planet gears 19*c* surround the sun gear and run in mesh with the sun and ring gears to rotatably drive the planet carrier 19*d* at speeds that are greatly reduced from the rotational speed of the rotor 16*b*. The planet carrier 19*d* is supported by bearing assemblies 19*f*, 19*g*. The planet carrier 19*d* drives an output pinion gear 19*h* that is mounted in the head assembly via a drive shaft 19*i*. In the illustrated knife, the blade 30 is formed with gear teeth around its perimeter at its axial end opposite the blade edge. The blade gear runs in mesh with the pinion driving gear 19*h*.

While a particular construction is illustrated and described, the blade, blade housing, head assembly, and gear drives may be of any suitable or conventional constructions. It should be noted that although an industrial knife exemplifies the hand tool 10 in this disclosure, other kinds of pneumatically operated hand tools may be constructed according to the invention.

Figure 8:
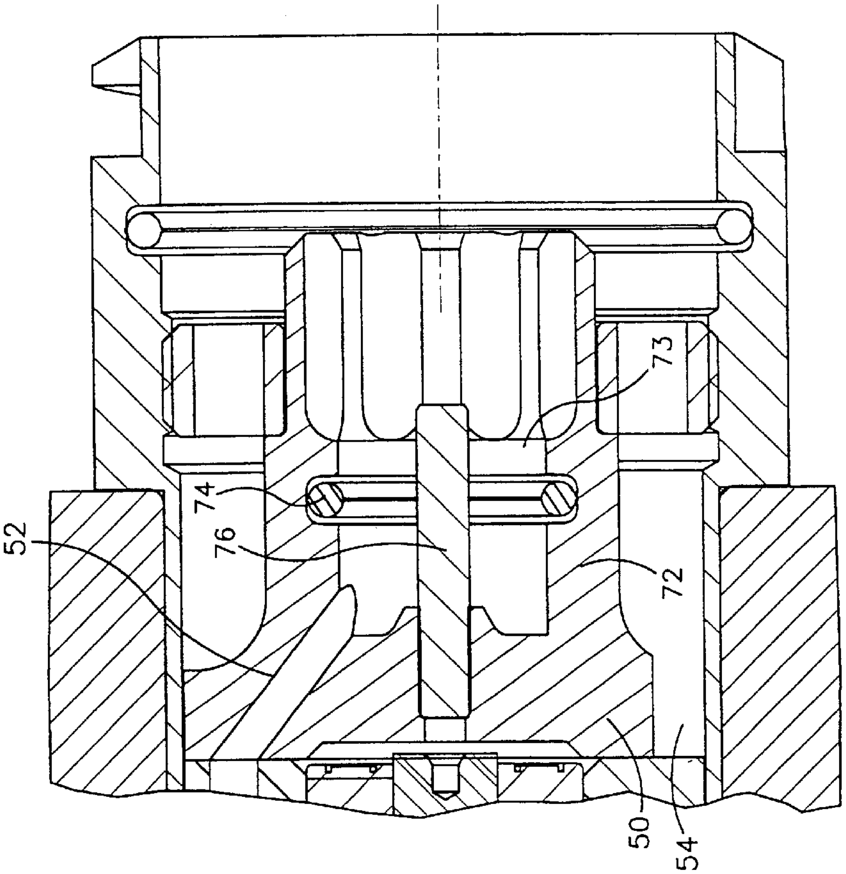
Figure 7:
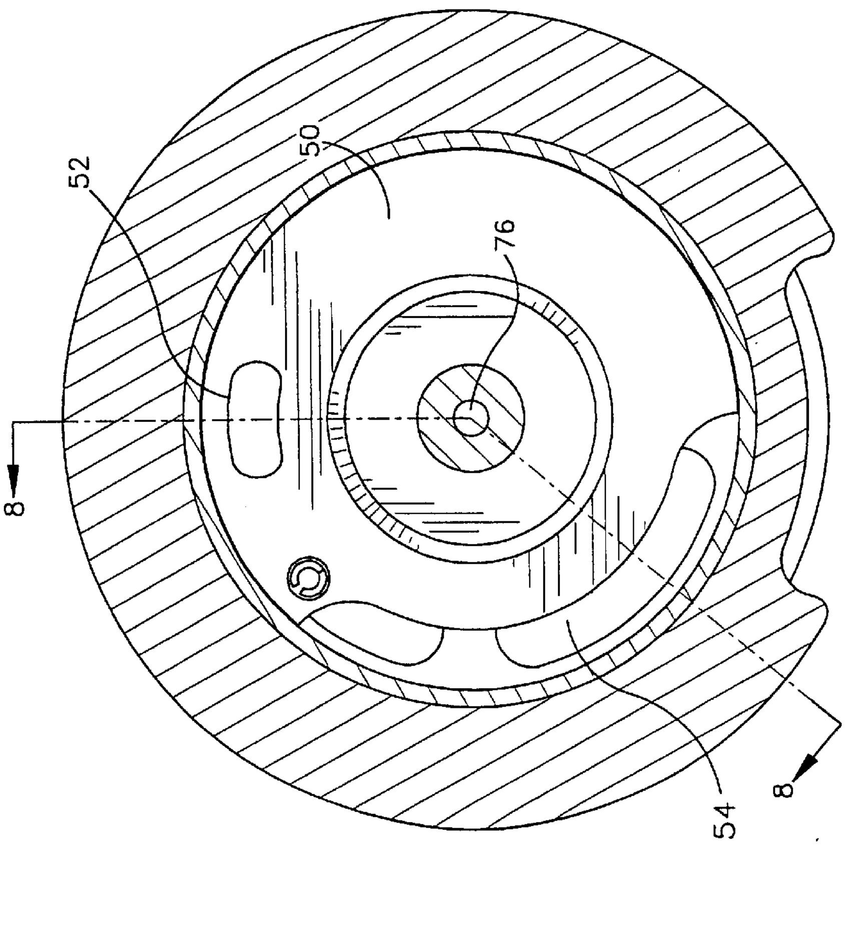
FIG. 7 is a cross sectional view seen approximately from the plane indicated by the line 7—7 of FIG. 2, with parts removed; and, FIG. 8 is a cross sectional view seen approximately from the plane indicated by the line 8—8 of FIG. 7.

Referring to FIGS. 1–4, the illustrated tool body comprises a tubular housing 42, an ergonomic handle sleeve 44 surrounding the housing 42, and end pieces 46, 48 that are fixed in the housing 42 and secure the motor assembly and drive transmission between them. The housing 42 is generally cylindrical while the sleeve 44 is irregularly shaped to conform with the shape of the tool users hand. The end piece 46 is fixed in the head end of the housing 42 and is formed by a generally cylindrical, tubular body that abuts the bearing assembly 19*f* at one of its ends and abuts the head assembly 36 at its opposite end. The end piece 46 has internal threads that receive the head assembly mounting screw. The end piece 48 is illustrated as fixed in the housing 42, fixed with respect to the stator 16*a* and abutting the rotor supporting bearing assembly 16*f*. The illustrated end piece 48 is formed by a generally circular port plate 50 that defines an air inlet port, or passage, 52 and an exhaust port, or passage, 54 each communicating with the motor assembly (see FIGS. 7 and 8).

The control valve 18 communicates the rotor 16*b* with the conduit 22 via the inlet port 52. When the control valve 18 is in an open condition (FIG. 3) the motor assembly 16 is operated from the pressure source and drives the tool. The outlet port 54 delivers exhaust air from the motor assembly 16 to the vent hose 24. When the control valve 18 is in its closed condition (FIG. 2) the motor 16 is not operated.

The illustrated control valve 18 comprises a tubular valve body 60 defining a delivery port 62 through which air is supplied to the motor 16 from the air source, a seat 64 surrounding the port 62, and a valving member 66 movable relative to the seat to open and close the port 62. The valving member 66 is biased toward engagement with the seat 64 to block flow through the port 62. In its open condition the control valve 18 is stationed relative to the tool body 14 in a first position where the valve body port 62 communicates directly with the motor inlet port 52 and the valving member 66 is spaced from the seat 64 so that air from the source is communicated to the motor for driving the rotor 16*b*. In the closed condition the valving member 66 is in a second position where the valving member engages the seat 64 for blocking flow from the pressure source through the control valve 18 and the valve body delivery port 62 communicates with air at ambient atmospheric pressure so that any source air leaking from the control valve delivery port is vented away from the motor inlet passage and into the exhaust hose 24.

In the illustrated hand tool the control valve 18 is axially shiftable relative to the tool body between a first position (see FIG. 3) where the valve is in its open condition and a second position (FIG. 2) where the valve is in its second, closed condition. In its first position the valve body sealingly engages the tool body in such a way that the delivery port 62 and the motor inlet port 52 are in direct communication so that source air is delivered to the rotor 16*b* for operating the motor. The disclosed control valve body 60 comprises a tubular projecting end 70 that surrounds the delivery port 62. When the valve 18 is in its first position, the projecting end 70 is in sealing engagement with the motor inlet port so that air delivered from the delivery port 62 is channeled directly to the motor. Air that is exhausted from the motor assembly flows from the rotor through the exhaust port 54 and into the space surrounding the valve body 60 and from there to the atmosphere via the vent hose 24.

In the illustrated tool the end piece 48 comprises a tubular projection 72 extending from the port plate 50 to form a receptacle with a central opening 73 into which the projecting valve body end 70 telescopes. The motor inlet port 52 opens through the port plate 50 into the opening 73 while the exhaust port 54 opens through the port plate radially outwardly of the projection 72 (see FIGS. 7 and 8). The region that surrounds the projection 72 is always at atmospheric pressure due to its communication with the vent hose 24. The opening 73 has a cross sectional shape that conforms to and closely surrounds the projecting valve body end 70 when the valve body is in its open condition. A seal member 74 is disposed within the projection 72 and extends between the receptacle opening 73 and the projecting valve body end 70 to prevent the escape of source air from the projection 72 to the surrounding region when the valve 18 is open. In the illustrated tool the projecting valve body end 70 and the receptacle opening are cylindrical and the seal member 74 is a resilient O-ring that is seated in a circumferential receptacle wall groove, but other forms of seals could be employed if desired.

As the valve body 60 moves axially into the housing 42 to its first position (FIG. 3), the projecting valve body end 70 and the receptacle wall are sealed together as the valve 18 opens. The illustrated end piece 48 includes a valve actuator pin 76 that is anchored in the port plate and extends through the opening 73 in alignment with the valve port 62. The actuator pin 76 engages the valving member 66 and shifts it off of the seat 64 to open the delivery port 62 when the valve 18 is in its open position. In the illustrated control valve the valving member is formed by a ball and is biased toward engagement with the seat by a helical spring 78. The valving member, spring, and actuator could be constructed in other ways. For example, the valving member might have a different shape and/or carry the actuator pin so that as the valve body advances, the actuator pin engages the receptacle and unseats the valving member.

As the valve body 60 moves to its second position (FIG. 2) it is shifted generally away from the housing 42 and the projecting valve body end 70 is withdrawn from the receptacle opening 73 as the valving member 66 returns to its seat 64. In its second condition the valve body end 70 is withdrawn from the seal member 74. The receptacle wall at the distal end of the projection 72 is internally fluted so that any air leaking from the port 62 is vented out of the receptacle opening to the region radially outward of the projection 72 and to the vent hose 24. If the valve 18 should leak when in its closed condition for any reason, the air leaking from the valve is vented to atmosphere rather than being directed into the motor inlet port. Consequently, it is not possible for undesired tool operation as a result of air flow from the control valve leakage.

In the illustrated tool 10, the valve 18 is carried by a coupling assembly 80 that functions to detachably couple the tool 10 to the conduit 20 as well as to enable the tool user to shift the valve 18 between its open and closed conditions. The illustrated coupling assembly (see FIG. 4) comprises a central body member 82 that carries the valve 18, a coupling collar 84 carried by the body member 82 for attaching the assembly to the tool 10, and a tool user grippable lever 88 for maintaining the valve 18 in its open condition.

Figure 3:
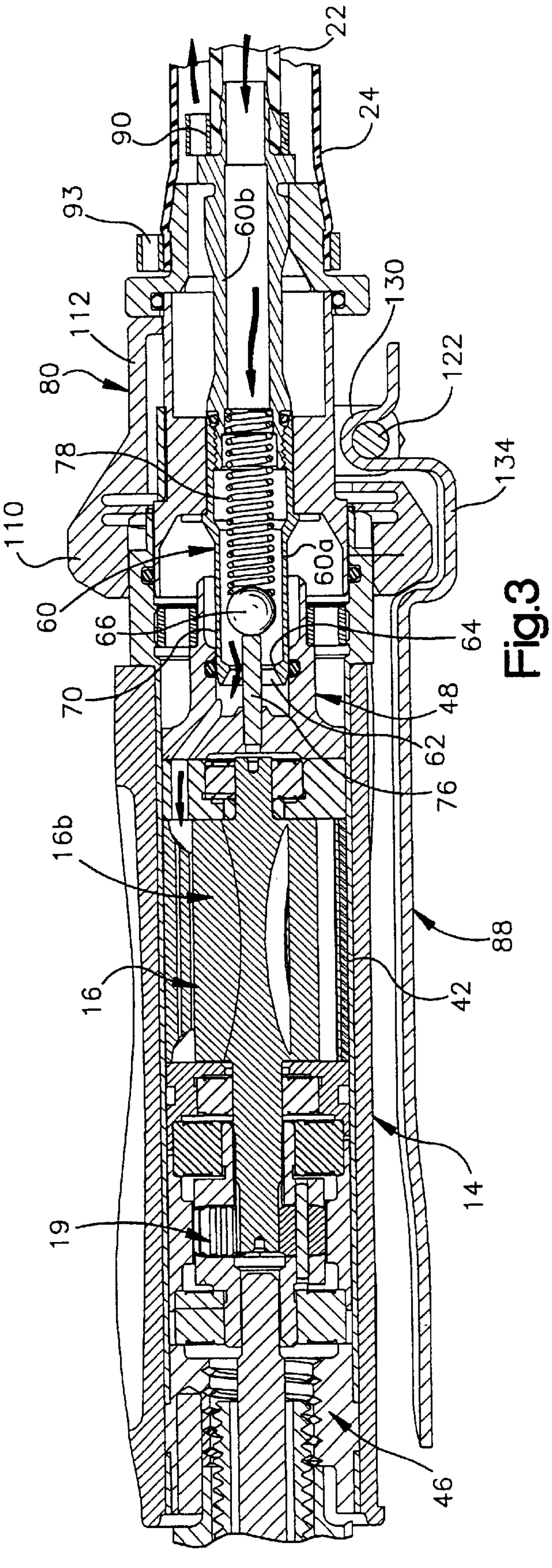
FIG. 3 is an enlarged fragmentary cross sectional view of the hand tool of FIG. 1 with the valve illustrated in an open, operating position.
Figure 4:
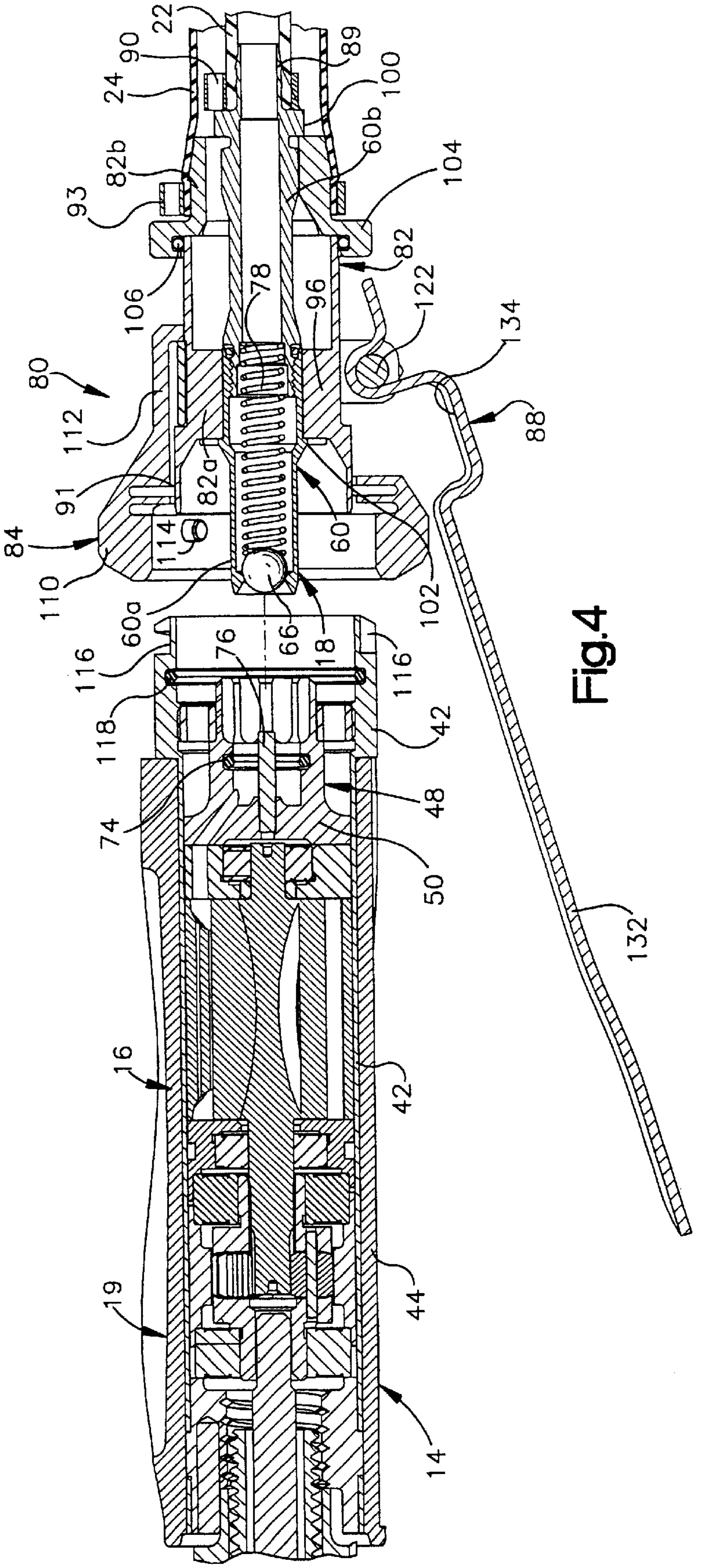
FIG. 4 is a view similar to FIG. 3 with the hand tool and air supply conduit separated.

In the illustrated coupling assembly 80, the body member 82 surrounds and supports the valve body 60. As shown in FIG. 3, the valve body 60 is a two part structure formed by generally cylindrical, tubular elements 60*a*, 60*b* that are sealed and screwed together at their juncture (the disclosed valve body 60 is so constructed to enable assembly of the valving member and biasing spring 78 inside the valve body). The element 60b has a projecting, barbed nipple-like end 89 (FIG. 4) that extends into the pressure hose 22 to fix and seal the valve body and pressure hose together. A hose clamp 90 surrounding the hose 22 and projecting element end assures a sealed connection.

The illustrated coupling body member 82 is a two part member formed by elements 82*a*, 82*b* that are hermetically secured together as a unit. A first member element 82*a* supports the valve body element 60*a* and is constructed to telescope into the tool body when the conduit 20 is attached to the tool. As shown, the element 82*a* has a cylindrical skirt-like projecting end 91 that fits closely within the end of the tool body housing 42. The second member element 82*b* supports the projecting end of the element 60*b* and is hermetically fixed to the exhaust hose 24. As shown, the element 82*a* has a projecting end that extends within the exhaust hose 24. A hose clamp 93 surrounds the hose end and the element projecting end to secure them together.

Figure 6:
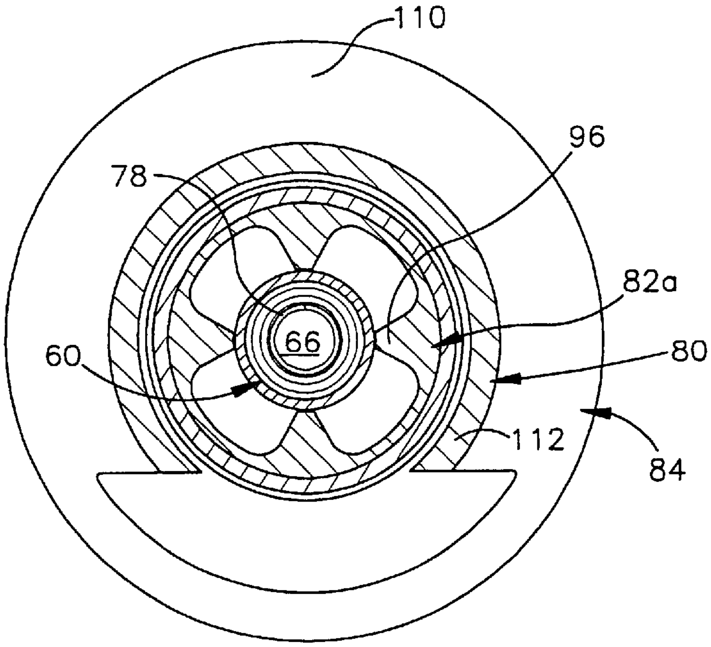
FIG. 6 is a cross sectional view seen approximately from the plane indicated by the line 6—6 of FIG. 2.

The coupling member 82 is generally cylindrical and has two elements 82*a*, 82*b*. These elements have cylindrical outer sections and a plurality of radially inwardly projecting spokes 96 that support the valve body 60 along the axes of the member 82 (see FIG. 6). The openings between the spokes 96 provide exhaust air flow passages between the is exhaust port 54 in the port plate 50 and the exhaust conduit 24.

In the illustrated tool the valve body 60 clamps the coupling member elements 82*a*, 82*b* together. The valve body element 60*b* has radially outwardly extending flange 100 that abuts the coupling member element 82*b* and defines a series of wrench flats along its periphery. A radially outwardly extending shoulder 102 on the valve body element 60*a* engages the coupling member element 82*a*. The coupling member elements 82 are assembled to the valve body 60 and the flange 100 is turned to screw the valve body elements together. The flange 100 and the shoulder 102 trap the elements 82*a*, 82*b* between them and firmly clamp the elements together as the valve body elements are screwed together. A flange 104 on the coupling member element 82*b* is moved into overlying relationship with the outer periphery of the coupling element 82*a* when the elements 82*a*, 82*b* are clamped together. An O-ring seal element 106 retained within the flange 104 and sealingly engages both elements 82*a*, 82*b* when they are clamped together.

Figure 5:
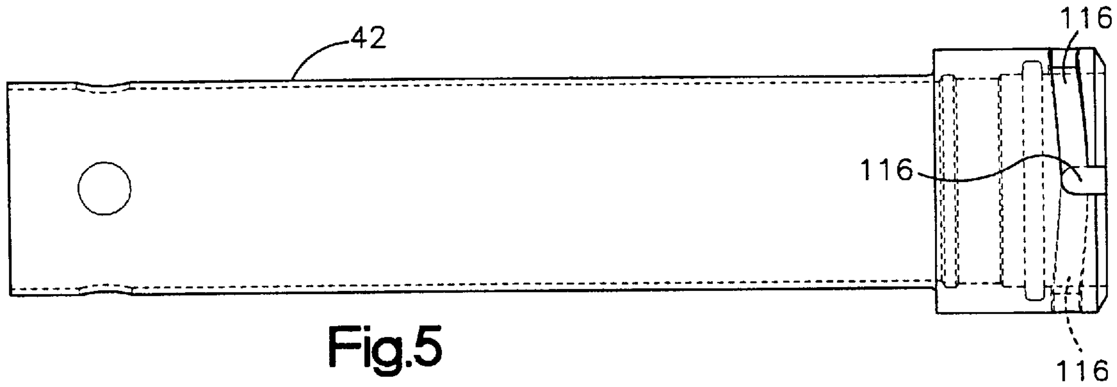
FIG. 5 is an elevational view of part of the hand tool illustrated in FIG. 1.

The coupling collar 84 functions to detachably secure the tool body to the conduit. The collar 84 has an annular body 110 that surrounds the element 82*a* and the end of the tool body housing 42 and an axially projecting, semi-cylindrical section 112 that closely surrounds the outer periphery of the element 82*a*. The inner periphery of the annular body 110 carries diametrically opposed pins 114 (FIG. 4) that project radially inwardly. The end of the tool body housing 42 forms radially outwardly opening cam slots 116 (see FIG. 5) that receive the pins 114. The collar 84 is slid onto the tool body housing 42 so that the pins 114 enter the cam slots 116. The collar is turned so that the pins follow, and are captured in, the cam slots. This action secures the conduit 20 to the tool 10 with the valve 18 in its closed position (FIG. 2) so that the tool is not supplied with motor operating air from the pressure source.

When the tool user wishes to operate the motor the user pushes the coupling member 82 axially into the tool body 14 (FIGS. 1 and 3). The member 82 slides axially into the tool body housing carrying the valve 18 along with it. A seal ring 118 stationed in the tool body housing inner periphery sealingly engages the projecting end 91 of the coupling member element 82*a* as the valve 18 moves to its open position. At the same time the valve body 60 enters the receptacle opening 73 and the valving member 66 is unseated by the actuator pin 76 resulting in high pressure air being supplied to the motor.

Figure 2:
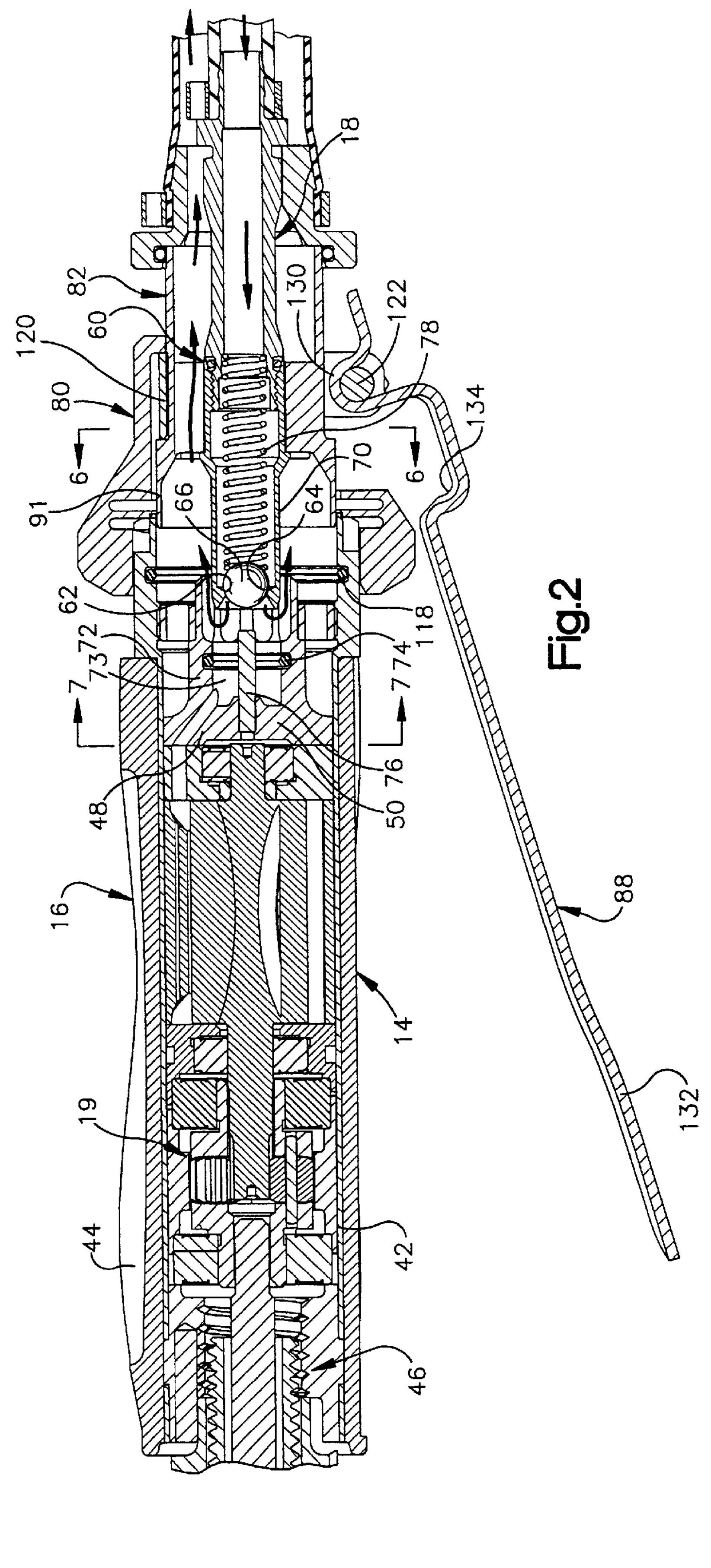
FIG. 2 is an enlarged fragmentary cross sectional view of the hand tool of FIG. 1 with a valve illustrated in a closed, non-operating position.

In the illustrated tool 10 the user manually maintains the operating airflow to the motor by gripping the lever 88 and holding it in juxtaposition with the handle. The illustrated lever 88 is connected to the coupling body element 82*a* by a clamp 120 and associated pivot pin, or pintle, 122 that are secured to the element 82*a*. The lever 88 is illustrated as a stamped sheet metal member comprising a pivot bearing section 130, a grip section 132 and a camming bight section 134. When the valve 18 is in its open position (FIGS. 1 and 3), the tool user grips the grip section of the lever 88 so that it is moved adjacent the tool handle. The camming bight section 134 of the lever engages the annular collar body 110 to maintain the valve open. Because of the length of the grip section 132, minimal tool user gripping force is required to maintain the lever in its FIGS. 1 and 3 position. User hand fatigue is thus avoided. If the lever is released by the tool user, the force of the valve spring 78 and the air pressure acting on the valving member 66 urge the coupling assembly 80 axially away from the tool. The collar body 110 reacts against the lever bight section 134 shifting the lever aside and allowing the valve 18 to close (FIG. 2).

While a single embodiment of the invention has been illustrated and described in detail, the invention is not to be considered limited to the precise construction disclosed. Various adaptations, modifications and uses of the invention may occur to those skilled in the art to which the invention relates. The intention is to cover all such adaptations, modifications, and uses that fall within the scope or spirit of the claims.

What is claimed is:

1. A rotary knife operable from a source of high pressure air comprising:

a tubular handle assembly;

an annular blade supported for rotation about a central axis;

a blade housing supporting said blade;

a head assembly connected to said handle assembly;

a pneumatic motor assembly supported by said handle assembly for driving said blade;

a control valve for controlling the flow of air from the source to the motor assembly, said control valve having an open condition wherein source air is supplied to said motor assembly for operating the motor and a closed condition wherein source air is blocked from reaching the motor assembly, said control valve shiftable into said handle assembly when operated to said open condition and shiftable in a direction away from said handle assembly when operated from its open condition to its closed condition;

said control valve having an air delivery port defined by a valve seat through which air is directed into said motor assembly when said control valve is in said open condition, said delivery port communicating with atmospheric air when said control valve is in said closed condition so that control valve leakage does not result in unintended knife operation.

2. The knife claimed in claim 1 wherein said control valve comprises a control valve body having a tubular projecting end that surrounds said delivery port and said handle assembly comprises a seal member for sealingly engaging said projecting valve body end when said control valve is in said open condition so that said delivery port communicates source air pressure directly to said motor assembly.

3. The knife claimed in claim 2 wherein said valve body projecting end is spaced away from said seal member when said valve body is in said second condition.

4. The rotary knife claimed in claim 1 wherein said knife is connected to a pressure source by a flexible conduit and further comprising a coupling assembly for detachably connecting said handle assembly to said conduit, said coupling assembly carrying said control valve and enabling the tool user to shift said control valve between said open and closed conditions.

5. A pneumatic hand tool operated from a pressurized air source comprising:

a tool body;

a pneumatic motor supported by said tool body for actuating a tool, said motor having an inlet port for receiving air from the source;

a control valve for controlling the flow of air from the source to the motor, said control valve having an open condition wherein source air is supplied to said motor for operating the tool and a second condition wherein the motor is not operated, said control valve comprising a valve body defining a delivery port through which air is supplied to said motor, a seat surrounding said port, and a valving member movable relative to said seat to open and close said port, said valving member biased toward engagement with said seat to block flow through said port;

in the open condition of said control valve said control valve body is stationed relative to said tool body in a first position wherein said delivery port communicates directly with said motor inlet port and said valving member is spaced from said seat so that air from said source is communicated to said motor, and in said second condition of said control valve said control valve body is in a second position relative to said tool body where said valving member engages said seat for blocking flow from said source through said delivery port and said delivery port communicates with air at ambient atmospheric pressure so that any source air leaking from said delivery port is vented away from said inlet port.

6. The hand tool claimed in claim 1 wherein said control valve is connected to a conduit that is connected to the source, said control valve extending into a receptacle formed by said tool body.

7. The hand tool claimed in claim 5 wherein said control valve body comprises a tubular projecting end that surrounds said delivery port and said tool body comprises a seal member for sealingly engaging said projecting end when said valve body is in said first position so that said delivery port and said inlet port are directly communicated.

8. The hand tool claimed in claim 7 wherein said valve body projecting end is spaced away from said seal member when said valve body is in said second position.

9. The hand tool claimed in claim 5 wherein said control valve further comprises a spring for biasing said valving member toward engagement with said seat.

10. The hand tool claimed in claim 5 further comprising an actuator member fixed with respect to said tool body for unseating said valving member when said control valve body is in said first position.

11. The hand tool claimed in claim 5 further comprising a hand grippable lever that is movable relative to said tool body between a gripped position where the lever maintains the control valve in said first condition and a released position where the control valve is in said second condition.

12. The hand tool claimed in claim 5 wherein said tool is connected to a pressure source by a flexible conduit and further comprising a coupling assembly for detachably connecting said tool body to said conduit, said coupling assembly carrying said control valve and enabling the tool user to shift said control valve between said open and second conditions.

13. The hand tool claimed in claim 12 wherein said coupling assembly comprises a collar that is detachably connectable to said tool body, and a coupling member that is shiftable relative to said collar, said coupling member supporting said control valve.

14. The hand tool claimed in claim 13 wherein said coupling assembly further comprises a manually grippable lever that maintains the control valve in its open condition, said coupling member supporting said lever for shifting movement therewith relative to said collar.

* * * * *